US010442533B2

United States Patent
Qiu et al.

(10) Patent No.: US 10,442,533 B2
(45) Date of Patent: *Oct. 15, 2019

(54) BATTERY USED FOR UNMANNED AERIAL VEHICLE AND UNMANNED AERIAL VEHICLE

(71) Applicant: AUTEL ROBOTICS CO., LTD., Shenzhen, Guangdong (CN)

(72) Inventors: Longxue Qiu, Guangdong (CN); Xingwen Wu, Guangdong (CN)

(73) Assignee: AUTEL ROBOTICS CO., LTD., Shenzhen, Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/180,520

(22) Filed: Nov. 5, 2018

(65) Prior Publication Data

US 2019/0071180 A1   Mar. 7, 2019

Related U.S. Application Data

(63) Continuation-in-part of application No. 15/598,914, filed on May 18, 2017, now Pat. No. 10,224,526.

(Continued)

(30) Foreign Application Priority Data

Dec. 14, 2015   (CN) .................... 2015 2 1037540 U

(51) Int. Cl.
   *B64C 39/02*     (2006.01)
   *H01M 2/10*     (2006.01)
   (Continued)

(52) U.S. Cl.
   CPC ............ *B64C 39/024* (2013.01); *B64C 25/08* (2013.01); *B64C 27/50* (2013.01); *B64D 27/24* (2013.01);
   (Continued)

(58) Field of Classification Search
   CPC ............. B64C 39/024; B64C 2201/06; B64C 2201/042; H01M 2220/20; H01M 2/1083
   See application file for complete search history.

(56) References Cited

U.S. PATENT DOCUMENTS 5,213,913 A   5/1993  Anthony, III et al.
5,589,288 A   12/1996 Coulson et al.
(Continued)

FOREIGN PATENT DOCUMENTS

CN   2451270 Y   10/2001
CN   1750416 A   3/2006
(Continued)

OTHER PUBLICATIONS

Opinions of the Patent Evaluation Report Patent No. ZL2015210375403 filed on Dec. 14, 2015.
(Continued)

*Primary Examiner* — Cynthia H Kelly
*Assistant Examiner* — Monique M Wills

(57) ABSTRACT

The present invention discloses an unmanned aerial vehicle including a main body, a plurality of arms, a propulsion assembly and a battery assembly, where each arm is coupled to the main body and the propulsion assembly is disposed on the each arm. The battery assembly is accommodated in a battery compartment of the main body. The battery assembly includes a shell, a battery body substantially disposed in the shell, a clamp button, and a restorable elastic piece. An end of the clamp button is mounted or connects to the shell, and the other end of the clamp button is detachably coupled to the main body. An end of the restorable elastic piece is disposed on the shell or connect to the shell, and the other end of the restorable elastic piece contacts the clamp button.

29 Claims, 3 Drawing Sheets

Related U.S. Application Data which is a continuation-in-part of application No. PCT/CN2016/103265, filed on Oct. 25, 2016.

(51) Int. Cl.
*B64D 27/24* (2006.01)
*B64C 25/08* (2006.01)
*B64C 27/50* (2006.01)

(52) U.S. Cl.
CPC ..... *H01M 2/1083* (2013.01); *B64C 2201/027* (2013.01); *B64C 2201/042* (2013.01); *B64C 2201/145* (2013.01); *H01M 2220/20* (2013.01)

(56) References Cited

U.S. PATENT DOCUMENTS

| | | | |
|---|---|---|---|
| 5,769,657 | A | 6/1998 | Kondo et al. |
| 5,869,204 | A | 2/1999 | Kottke et al. |
| 6,136,467 | A | 10/2000 | Phelps, III et al. |
| 6,371,535 | B2 | 4/2002 | Wei et al. |
| 6,623,049 | B2 | 9/2003 | Shreeve et al. |
| 6,660,427 | B1 | 12/2003 | Hukill et al. |
| 6,729,413 | B2 | 5/2004 | Turner et al. |
| 6,876,173 | B2 | 4/2005 | Mastaler et al. |
| 7,989,969 | B2 | 8/2011 | Grant et al. |
| 8,534,717 | B2 | 9/2013 | Whetten et al. |
| 8,973,861 | B2 | 3/2015 | Zhou et al. |
| D740,222 | S | 10/2015 | Tang |
| 2002/0125857 | A1 | 9/2002 | Mastaler et al. |
| 2003/0039880 | A1* | 2/2003 | Turner ............... H01M 2/1022 429/97 |
| 2004/0192106 | A1 | 9/2004 | Britz |
| 2007/0012818 | A1 | 1/2007 | Miyazawa et al. |
| 2008/0241675 | A1 | 10/2008 | Enari et al. |
| 2008/0268329 | A1 | 10/2008 | Mackle et al. |
| 2012/0196168 | A1 | 8/2012 | Hirsch et al. |
| 2013/0031762 | A1 | 2/2013 | Chellew et al. |
| 2013/0224528 | A1 | 8/2013 | Johnson et al. |
| 2013/0309545 | A1 | 11/2013 | Daubitzer et al. |
| 2015/0158392 | A1 | 6/2015 | Zhao |
| 2015/0314434 | A1 | 11/2015 | Bevins, Jr. et al. |
| 2016/0039300 | A1 | 2/2016 | Wang et al. |
| 2016/0130015 | A1 | 5/2016 | Caubel et al. |
| 2016/0179096 | A1 | 6/2016 | Bradlow et al. |
| 2017/0001721 | A1 | 1/2017 | Saika et al. |
| 2018/0076431 | A1 | 3/2018 | Qiu et al. |

FOREIGN PATENT DOCUMENTS

| | | | |
|---|---|---|---|
| CN | 141472413 | A | 7/2009 |
| CN | 201528005 | U | 7/2010 |
| CN | 201728641 | A | 2/2011 |
| CN | 201728641 | U | 2/2011 |
| CN | 204144349 | U | 2/2015 |
| CN | 204223172 | U | 3/2015 |
| CN | 204230318 | U | 3/2015 |
| CN | 204230319 | U | 3/2015 |
| CN | 104505477 | A | 4/2015 |
| CN | 204415738 | U | 6/2015 |
| CN | 204596856 | U | 8/2015 |
| CN | 204614830 | U | 9/2015 |
| CN | 204651359 | U | 9/2015 |
| CN | 204966559 | U | 1/2016 |
| CN | 205005377 | U | 1/2016 |
| CN | 205159402 | U | 4/2016 |
| CN | 205376593 | U | 7/2016 |
| CN | 205645917 | U | 10/2016 |
| CN | 206077007 | U | 4/2017 |
| CN | 106031318 | B | 9/2017 |
| CN | 206719560 | U | 12/2017 |
| EP | 0734083 | B1 | 9/1996 |
| JP | 2007-123082 | A | 5/2007 |
| JP | 2008-066144 | A | 3/2008 |
| JP | 2013-226855 | A | 11/2013 |
| WO | 2015/179797 | A1 | 11/2015 |
| WO | 2017/204592 | A1 | 11/2017 |

OTHER PUBLICATIONS

International Search Report and Written Opinion dated Jan. 23, 2017;PCT/CN2016/103265.
First Office Action of Continuation application U.S. Appl. No. 15/671,371, filed Aug. 8, 2017.
Second Office Action of Continuation application U.S. Appl. No. 15/671,371, filed Aug. 8, 2017.
DJI-1012 Safety of Lithium-ion Batteries by The European Association for Advanced Rechargeable Batteries, Jun. 2013, 26 pages.
DJI-1021 Screenshot of the home page for the publicly-accessible DJI website (dji.com), available in Apr. 2014, (archived Apr. 13, 2004), 3 pages.
DJI-1022 Screenshot of the publicly-accessible Phantom 2 Vision+ product page (http://www.dji.com/product/phantom-2-vision-plus/) from Apr. 2014, (archived Apr. 2014), 3 pages.
DJI-1023 Screenshot of the publicly-accessible Phantom 2 Vision+ downloads page (Https://www.dji.com/phantom-2-vision-plus/downloads) from Apr. 2014 (archived Apr. 10, 2014), 2 pages.
DJI-1024 Screenshot of the publicly accessible Phantom 2 Vision+ User Manual Version 1.1.1 from Apr. 2014 (archived Apr. 11, 2014), 1 page.
DJI-1025 Phantom 2 Vision+ User Manual (EN) v.1.1.1, available Apr. 7, 2014, 74 pages.
DJI-1026 Apr. 7. 2014 press release "DJI has released its new ready to fly quadcopter, the Phantom 2 Vision+", (archived Apr. 15, 2014), 2 pages.
DJI-1027 Phantom 2 Vision+ User Manual (EN) v.1.2, available Jun. 26, 2014, 2 pages.
DJI-1028 Phantom 2 Vision+ product download page, (archived Jun. 26, 2014) http://www.dji.com/product/phantom-2-vision-plus/download, 2 pages.
DJI-1029 Phantom 2 Vision+ User Manual (EN) v.1.4, available Aug. 15, 2014, 52 pages.
DJI-1030 Phantom 2 Vision+ download page, (archived Oct. 14, 2014) http://www.dji.com/product/phantom-2-vision-plus/download, 2 pages.
DJI-1031 Phantom 2 Vision+ download page, (archived Oct. 20, 2014) http://www.dji.com/product/phantom-2-vision-plus/download, 2 pages.
DJI-1032 Phantom 2 firmware press release dated Oct. 27, 2014(archived Oct. 31, 2014), 2 pages.
DJI-1033 Phantom 2 Vision+ User Manual (EN) version 1.6, available Nov. 12, 2014, 52 pages.
DJI-1034 Phantom 2 Vision+ product download page (archived Nov. 14, 2014) http://wwww.dji.com/product/phantom-2-vision-plus/downlaod, 2 pages.
DJI-1035 Phantom 2 Vision+ product download page, (archived Dec. 29, 2014) http://www.dji.com/product/phantom-2-vision-plus/download, 2 pages.
DJI-1041 http://www.dji.com/product/phantom-2-vision=plus/download, archived Nov. 19, 2015, 2 pages.
DJI-1042 Mar. 3, 2015 press release "DJI has released the new firmware v.3.08 for Phantom 2 series quadcopter", archived Mar. 5, 2015, 2 pages.
DJI-1043 "DJI hantom 2 Vision+ Review; Buttery Smooth Quadcopter Video", http://gizmodo.com/dji-phantom-2-vision-review-buttery-smooth-quadcopter-1559567158, archived Apr. 10, 2014, 6 pages.
DJI-1044 "DJI Phantom 2 Vision Plus Review"Quadcopter HQ, Apr. 14, 2014, archived Nov. 23, 2014 with link to User Manual on dji.com, 6 pages.
DJI-1045 "DJI Phantom 2 Vision+ review: Top-notch eye in the sky". CNET, Oct. 14, 2014, 4 pages.
DJI-1046 DJI Phantom 2 Vision Plus + First Look and Review & Rating, DroneFlyers, Jul. 4, 2014. 7 pages.
DJI-1047 "Phantom 2 Vision Plus—Initial Unboxing", RC Geeks Blog, available at www.rcgeeks.co.ukblogphantom-2-vision-pius-initial-unboxing, 7 pages.

(56) References Cited

OTHER PUBLICATIONS

U.S. Appl. No. 62/187,205, filed Jun. 30, 2015.
Remote Controller Design Guide, 30 pages, DJIATL0452865-DJIATL0452894.
DJI Vision App Design Guide, 21 pages. DJIATL0452895-DJIATL0452915.
BACL FCC Part 15.247 Test Report; FCC ID: WQ8301AC58A1 62 pages, DJIATL0453290-DJIATL0453351.
Letter from Autel ITC to FCC; dated Mar. 11, 2015; Confidentiality Request regarding application for certification of FCC ID: WQ8301AC58A1, 1 page; DJIATL0453252.
Letter from 3DR to FCC dated Apr. 28, 2015; Request for Permanent Confidentiality, 1 page, DJIATL0451887.
Autel, Maxaero, X-Memo, X-Star Manual, 95 pages, DJIATL0453352-DJIATL0453446.
FCC ID WQ8301AC58A1 X-Star 3, Aug. 20, 2018; 4 pages, DJIATL0453248-DJIATL0453251.
Phantom 2 Vision + User Manual, Feb. 14, 2014 Revised, 30 pages, DJIATL0452835-DJIATL0452864.
Phantom 4 Unboxing a Detailed First Look; Apr. 5, 2018; 36 pages, DJIATL0452489-DJIATL0452524.
Solo Operation Manual 3DR, 40 pages, DJIATL0451893-DJIATL0451932.
T1000 with GPS, Hexa-copter manual versionV0.1, Nov. 10, 2012, 27 pages, DJIATL0452567-DJIATL0452593.
Third-Party Preissuance Submission Per 37. C.F.R. 1,290 U.S. Appl. No. 15/812,773, filed Nov. 14, 2017.
Third-Party Preissuance Submission Per 37. C F.R. 1.290, U.S. Appl. No. 15/812,805, filed Nov. 14, 2017.
Third-Party Preissuance Submission Per 37. C.F.R. 1.290, U.S. Appl. No. 15/812,880, filed Nov. 14, 2017.
In United States District Court for The District of Delaware C.A. No. 16-706-LPS-CJB (Consolidated) Counterclaim Defendants' Initial Invalidity Contentions Respecting U.S. Pat. No. 9,979,000. Prior Art (Photos).
DJI-1036 Phantom 2 Vision+ product download page, (archived Jan. 20, 2015) http://www.dji.com/product/phantom-2-vision-plus/download, 3 pages.
DJI-1037 Phantom 2 Vision+ User Manual (EN) version 1.8, available Jan. 30, 2015, 52 pages.
DJI-1038 Phantom 2 Vision+ product download page (archived Feb. 7, 2015) http://www.dji.com/product/phantom-2-vision-plus/download), 2 pages.
DJI-1039 http://www.dji.com/product/phantom-2-vision-plus/download, archived Mar. 10, 2015, 2 pages.
DJI-1040 http://www.dji.com/product/phantom-2-vision-plus/download, archived Sep. 7, 2015, 2 pages.
Third-Party Preissuance Submission Per 37. C.F.R. 1.290 U.S. Appl. No. 15/812,836, filed Jun. 11, 2018.

* cited by examiner

BATTERY USED FOR UNMANNED AERIAL VEHICLE AND UNMANNED AERIAL VEHICLE

CROSS-REFERENCE TO RELATED APPLICATIONS

This application is a continuation-in-part of U.S. patent application Ser. No. 15/598,914 filed on May 18, 2017, which is a continuation-in-part of International Application No. PCT/CN2016/103265 filed on Oct. 25, 2016, which claims priority to Chinese Application No. CN201521037540.3 filed on Dec. 14, 2015, both of which are hereby incorporated by reference in their entirety.

TECHNICAL FIELD

The present invention relates to the field of unmanned aerial vehicle, more particularly, relates to a battery used for unmanned aerial vehicle and an unmanned aerial vehicle including a battery.

BACKGROUND

With the development of the technology and the requirement of national economic development, an unmanned aerial vehicle which was used in military market has been frequently used in civilian market. In civilian market, the unmanned aerial vehicle could be used for power line inspection, mapping, traffic security, advertising celebration and so on. The civilian market is huge, and there is wide space for development. The unmanned aerial vehicle for civilian use is generally controlled by a wireless remote controller or a ground station. During flight, the unmanned aerial vehicle transmits the flight data or videos or other information to the ground station, and a user can know the flight status and other information of the unmanned aerial vehicle through the ground station.

In prior arts, a cavity for accommodating a battery (such as a lithium battery) is provided in a main body of the unmanned aerial vehicle. Generally, in order to prevent the battery dropping from the cavity during flight, a sealing board for fastening the battery is provided at an opening of the cavity. The sealing board is usually fixed to the main body of the unmanned aerial vehicle by screws, bolts or other fasteners. In order to change a battery, the screws or bolts shall be unscrewed. After the battery is replaced, a user shall fasten or tighten the screws or bolts. In this way, it is inconvenient to replace a battery.

SUMMARY

The present disclosure provide a battery and an unmanned aerial vehicle to overcome the problems in the prior art.

In an embodiment of the invention, the unmanned aerial vehicle comprises:

a main body comprising a battery compartment;

a plurality of arms, wherein each arm is coupled to the main body and extends laterally from the main body;

a propulsion assembly disposed on the each arm, wherein the propulsion assembly comprises a propeller, the propeller comprising two rotor blades; and a battery assembly capable of being accommodated in the battery compartment, wherein the battery assembly comprises:

a shell;

a battery body substantially disposed in the shell;

a clamp button, wherein a first end of the clamp button is mounted directly or indirectly to the shell and a second end of the clamp button is capable of being detachably coupled to the main body; and a restorable elastic piece, wherein a first end of the restorable elastic piece is disposed on the shell or connects directly or indirectly to the shell, a second end of the restorable elastic piece contacting the clamp button;

wherein the battery compartment comprises a clamping portion, the second end of the clamp button defining a hook configured to engage the clamping portion of the battery compartment.

Because a clamp button is configured on the shell of a battery, the battery is capable of detachably connecting to the main body of the unmanned aerial vehicle. And therefore it is more convenient to replace or change a battery.

BRIEF DESCRIPTION OF THE DRAWINGS

In order to more clearly describe the technology in the embodiments of the invention or prior arts, it will make a simple introduction to the drawings with respect to the embodiments or prior arts. Obviously, the following drawings are some of embodiments of the present invention. The person having ordinary skill in the art can obtain other drawings based on the following drawings without any creative work.

DESCRIPTION OF THE EMBODIMENTS

The technical solution in the present invention will herein be described clearly and fully in a combination with the drawings. Obviously, embodiments described below are part of the possible embodiments of the present invention, and not all embodiments of the present invention. Based on the embodiments described below, the embodiments, which are obtained by a person having ordinary skill in the art without creative work, are in the scope of the present invention.

In the following embodiments of the present invention, unless there is an another expressly definition, the term "install", "connected" or "connecting" should be understood in a broad sense, for example, it could be interpreted as fixed connection, or detachable connection, or integral connection. It also could be interpreted as direct connection, or indirect connection via a component. The person having ordinary skill in the art could understand specific meanings of the above terms in the present invention based on specific circumstance.

Moreover, the technical features described in different embodiments described below can be combined as long as there is no conflict between each other.

Figure 1:
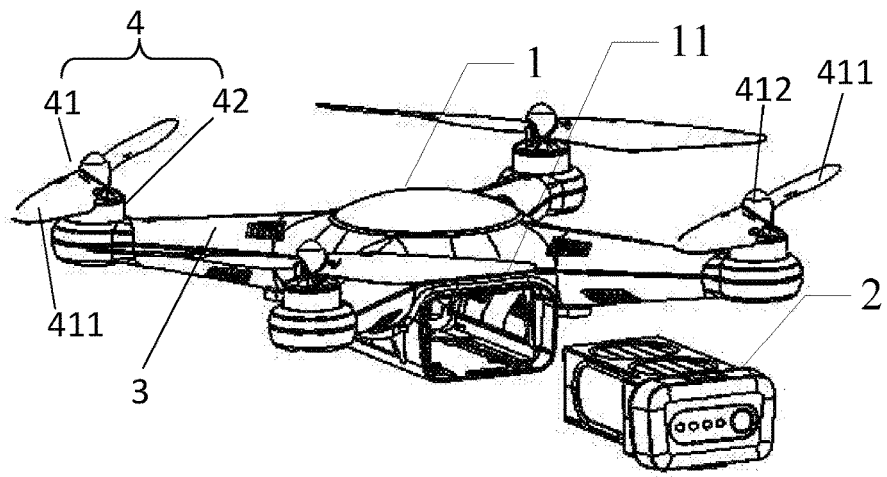
FIG. 1 is a disassembled structure diagram of an unmanned aerial vehicle in an embodiment of the present invention.

FIG. 1 illustrates an embodiment of an unmanned aerial vehicle. The unmanned aerial vehicle includes an unmanned aerial vehicle main body 1 and an unmanned aerial vehicle battery 2. The unmanned aerial vehicle further includes a plurality of arms 3, where each arm 3 is coupled to the main body 1. In an embodiment of the invention, the unmanned aerial vehicle includes at least two arms. For example, the unmanned aerial vehicle may include three arms, or four arms, or six arms. When four arms are provided, the unmanned aerial vehicle is also called as quadrotor or "four-rotor aircraft".

As illustrated in FIG. 1, the unmanned aerial vehicle further includes a propulsion assembly 4. In an embodiment of the invention, the number of the propulsion assembly 4 is the same as the number of the arms 3. The propulsion assembly 4 is mounted on an end of the arm 3, for example, a distal end of the arm 3. In an embodiment as indicated in FIG. 1, the propulsion assembly 4 includes a propeller 41 and a motor 42. The motor 42 is configured to drive the propeller 41 to rotate in order to generate lift force or thrust force. In one embodiment of the invention, the motor 42 is a brushless motor and includes a driveshaft.

In one embodiment of the invention, the propeller 41 includes at least two rotor blades, such as two or three rotor blades. For example, referring to FIG. 1, the propeller 41 includes two rotor blades 411. In some embodiments of the invention, the rotor blades (such as the rotor blades 411) of the propeller 41 are foldable. In some embodiments of the invention, the propeller 41 further includes a hub. The propeller 41 is mounted on the motor 42 through the hub. For example, referring to FIG. 1, the rotor blade 411 is coupled fixedly or foldably to the hub 412. The hub 412 is connected to the driveshaft of the motor 42 so that the motor can drive the propeller 41 to rotate in clockwise direction or in counterclockwise direction.

In an embodiment of the invention, the hub 412 engages with the driveshaft of the motor 42 through threaded connection. For example, the driveshaft is provided with a male threaded structure in the outer surface of the driveshaft. The hub 412 includes a cavity, and a female threaded structure is provided in the cavity. The hub 412 thus engages with the motor through the threaded connection.

In an embodiment of the invention, the propeller 41 can be released from the motor 42 through lugs and notches. For example, the hub 412 defines at least two lugs, and the motor 42 defines at least two notches. The lugs on the hub 412 engage the notches on the motor 42.

In some embodiments of the invention, the propulsion assembly includes a first propulsion assembly and a second propulsion assembly. The first propulsion assembly includes a first propeller which rotates in clockwise direction, and the second propulsion assembly includes a second propeller which rotates in counterclockwise direction. In an embodiment of the invention, the unmanned aerial vehicle includes at least one electrical component. The electrical component can be selected from the group consisting of Global Position System (GPS) module, compass, flight control module, and image processing unit. The at least one of the electrical component are disposed in a cavity formed by the main body 1 or the arm 3.

In some embodiments of the invention, the unmanned aerial vehicle further includes a landing gear in order to support the unmanned aerial vehicle when the unmanned aerial vehicle is on the ground. The landing gear may be foldable. In one embodiment of the invention, the landing gear is fixed to the downside of the arm 3. In other embodiment of the invention, the landing gear is fixed to the underside of the main body 1.

In some embodiments of the invention, the landing gear is detachable, in order to save the storage space.

Figure 2:
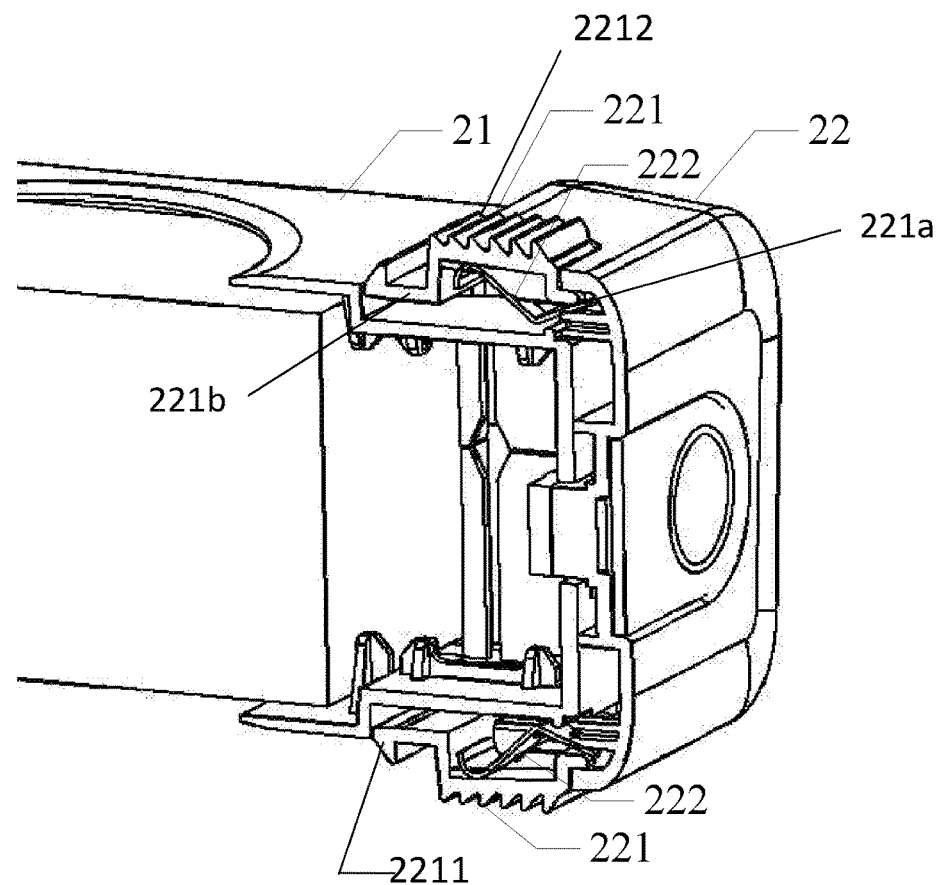
FIG. 2 is a structure diagram of a battery used for the unmanned aerial vehicle in an embodiment of the present invention.
Figure 3:
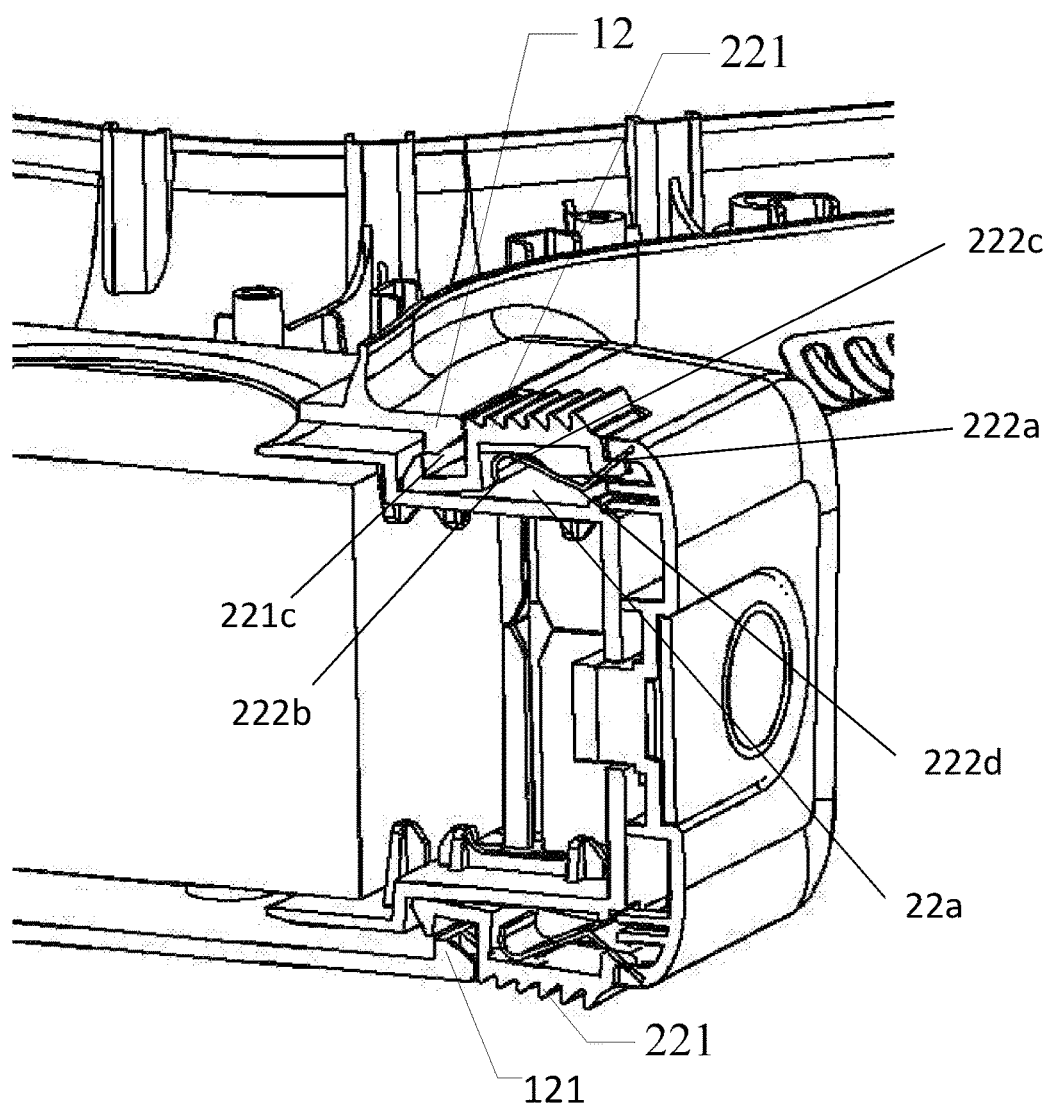
FIG. 3 is an illustration of connecting the battery to a main body of the unmanned aerial vehicle in an embodiment of the present invention.

FIGS. 1-4 illustrate an embodiment of battery. The battery 2 is detachably connected to the main body 1 of the unmanned aerial vehicle. Referring to FIG. 2, the battery 2 includes a battery body 21 and a shell 22 disposed on one end of the battery body 21. A clamp button 221 is configured on a side of the shell 22. In an embodiment of the invention, each opposite side of shell includes a clamp button 221. In one embodiment, one end 221a of the clamp button 221 is fixed or coupled to the shell 22 and the other end 221b of the clamp button 221 is configured to detachably connect to the unmanned aerial vehicle. In an embodiment of the invention, the end 221b of the clamp button 221 that is configured to detachably connect to the unmanned aerial vehicle has a hook 2211. The hook 2211 is configured to detachably hang on the unmanned aerial vehicle. Referring to FIG. 3, a groove 221c is formed between the hook 2211 and the body of the clamp button 221 to prevent the body of the clamp button from mechanical interfering with the unmanned aerial vehicle. In an embodiment, there are at least two clamp buttons 221. The at least two clamp buttons 221 are disposed on opposite sides of the shell 22. Specifically, the at least two clamp buttons 221 are disposed on an upper side and lower side of the shell 22. In an embodiment, in order to increase the touching friction of the clamp button 221 and prevent slipping when a user touches the clamp button 221, an anti-slip structure 2212 is provided on an outer surface between one end 221a of the clamp button 221 and the other end 221b of the clamp button 221. In an embodiment of the invention, the anti-slip structure 2212 is a wave shape convex structure.

In an embodiment, the battery 2 further includes a restorable elastic piece 222. With the help of restorable elastic piece 222, the clamp button 221 can automatically return to original position. In an embodiments, referring to FIG. 3, the restorable elastic piece 222 is disposed on the clamp button 221. Specifically, the restorable elastic piece 222 can be disposed on an inner side of the clamp button 221. One end 222a of the restorable elastic piece 222 connects to the shell 22 and the other end 222b of the restorable elastic piece 222 contacts the clamp button 221. In some embodiments of the invention, the other end 222b of the restorable elastic piece 222 abuts against the clamp button 221.

In some embodiments, the end 222a of the restorable elastic piece 222 is disposed on the shell 22 and abuts against the shell 22, the other end of the restorable elastic piece 222b contacts the clamp button 221 and is fixed with the clamp button 221. In other embodiments, the end 222a of the restorable elastic piece 222 is fixed with the shell 22 and the other end 222b abuts against the clamp button 221.

Alternatively, in some embodiments of the invention, the end 222a of the restorable elastic piece 222 abuts against the shell and the end 222b abuts against the clamp button 221. In another embodiment, the end 222a of the restorable elastic piece 222 is stuck in the shell and the end 222b abuts against the clamp button 221. In some other embodiments of the invention, the end 222a of the restorable elastic piece 222 abuts against the shell and the end 222b is stuck in the clamp button.

Referring to FIG. 3, in some embodiments, the end 222a also can be formed by a portion extending from a bending portion 222d to the end that the label "222a" points to. The bending portion 222d of the end 222a can be fixed with a plate 22a of the shell 22 and the other end 222b abuts against the clamp button 221. In other embodiments, the bending portion 222d of the end 222a abuts against the plate 22a of the shell 22 and the other end 222b is fixed with the clamp button 221.

In an embodiment of the invention, the restorable elastic pieces 222 are mirror symmetric and have an S-shape in order to better stick in the inner side of the clamp button 221. The end 222a of the restorable elastic piece 222 is stuck in the shell 22. For example, the end 222a which is stuck in the shell can be pressed by the end 221a of the clamp button 221 which contacts this end 222a. An arc surface 222c of the end 222b contacts a lower surface of the clamp button 221. In this way, the restorable elastic piece 222 can provide the clamp button 221 with a driving force of returning to original place.

Because the clamping button 221 is provided on the upper and lower sides of the shell 22, the clamp button 221 can be pressed down and the unmanned aerial vehicle can be thus moved inwards. The clamp button 221 is capable of returning to the original place automatically under the function of the restorable elastic piece 222 after hands of a user are loosen. Therefore, it is realized to detachably connect the battery 2 to the main body 1 of the unmanned aerial vehicle. It is also convenient for a user to replace a battery.

Referring to FIG. 1, the main body 1 includes a battery compartment 11. Referring to FIG. 3, an end of an opening of the battery compartment 11 has a clamping portion 12, where the end of the opening contacts the shell of the battery 2. The clamping portion 12 is detachably connected to the clamp button 221. In an embodiment, the clamping portion 12 may be disposed on an outer surface of the opening. In an embodiment, a clasper 121 is provided on a surface of the clamping portion 12, where the surface of the clamping portion 12 contacts the clamp button 221. Specifically, the clasper 121 crooks inwards the opening and engages with the hook 2211 of the clamp button 221 in order to connect the clamp button 221 to the main body of the unmanned aerial vehicle. Preferably, there are at least two clamping portions 12, and the at least two clamping portions 12 are disposed on opposite sides of the opening respectively. Specifically, the position of the clamping portion 12 should match with the position of the clamp button 222 when the clamp buttons 222 is in a state where the clamp buttons 222 are connected with the main body 1 of the unmanned aerial vehicle.

Figure 4:
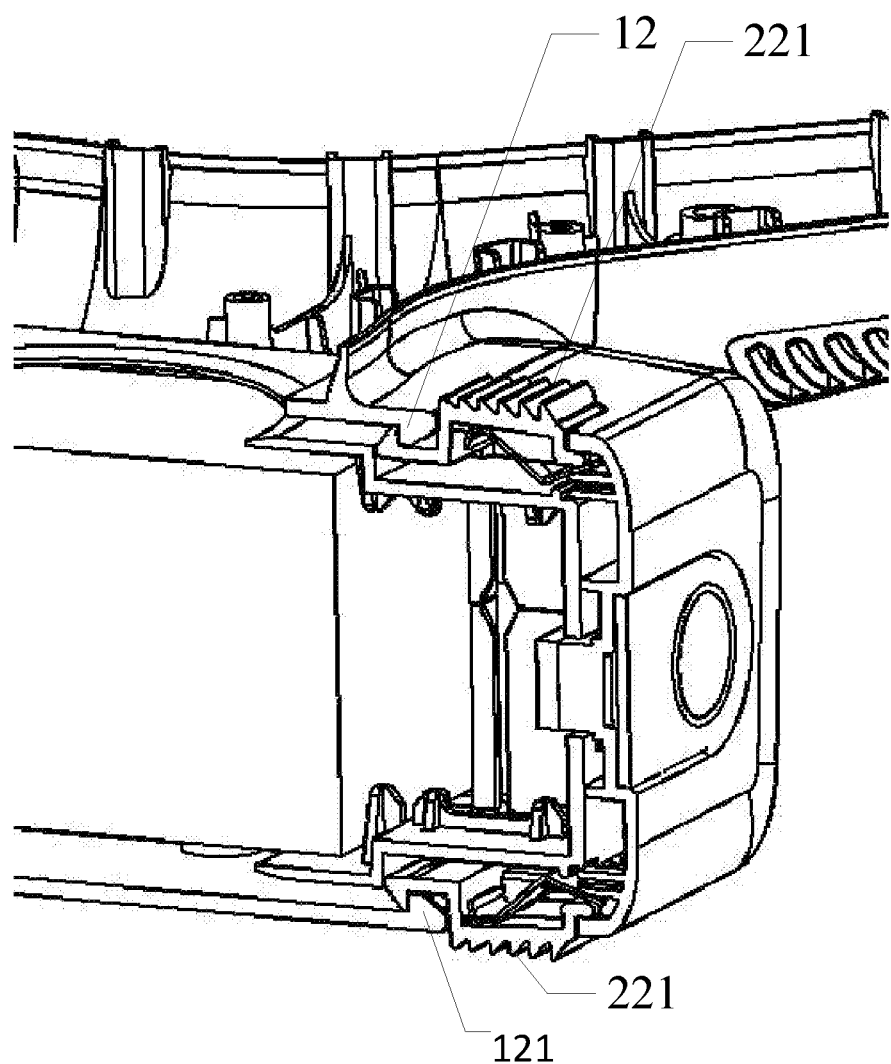
FIG. 4 is another illustration of connecting the battery to the main body of the unmanned aerial vehicle in an embodiment of the present invention.

Referring to FIG. 3, in an embodiment of the invention, when need to install the battery 2 to the main body 1 of the unmanned aerial vehicle, just put the battery 2 on the opening of the battery compartment 11 and push the battery 2 into the battery compartment 11. The clamp buttons 221 will press down the restorable elastic pieces 222 under the extrusion of the upper and lower clamping portions 12 of the battery compartment 11. In this way, the battery 2 will be pushed into the battery compartment 11. Referring to FIG. 4, when the clamp button 221 is totally pushed into the battery compartment 11, the restorable elastic piece 222 will automatically rebound in order to make the clamp button 221 return back to its original place, and the battery 2 will be stuck tightly by the upper and lower clamping portion 12 on the opening of the battery compartment 11. Similarly, when need to remove the battery 2 from the battery compartment 11, just press down the clamp buttons 221 upwards and downwards and pull out the battery at the same time. In this way, the battery will be easily pulled out or released from the battery compartment.

Apparently, the embodiments described above are just some examples for clearly illustrating the present invention. It is not intent to limit the scope of the present invention within the embodiments described above. For a person having ordinary skill in the art, various changes or alterations can be made based on the above embodiments. It's not necessary to enumerate any and all embodiments. The obvious changes and alterations which are made based on the embodiments described above are still in the scope of the present invention.

What is claimed is:

1. An unmanned aerial vehicle, comprising:
    a main body comprising a battery compartment;
    a plurality of arms, wherein each arm is coupled to the main body and extends laterally from the main body;
    a propulsion assembly disposed on the each arm, wherein the propulsion assembly comprises a propeller, the propeller comprising two rotor blades; and
    a battery assembly capable of being accommodated in the battery compartment;
    wherein the battery assembly comprises:
        a shell;
        a battery body substantially disposed in the shell;
        a clamp button, wherein a first end of the clamp button is mounted directly or indirectly to the shell and a second end of the clamp button is capable of being detachably coupled to the main body; and
        a restorable elastic piece, wherein a first end of the restorable elastic piece is disposed on the shell or connects directly or indirectly to the shell, a second end of the restorable elastic piece contacting the clamp button;
    wherein the battery compartment comprises a clamping portion, the second end of the clamp button defining a hook configured to engage the clamping portion of the battery compartment.

2. The unmanned aerial vehicle according to claim 1, wherein the first end of the restorable elastic piece is stuck in the shell.

3. The unmanned aerial vehicle according to claim 1, wherein the second end of the restorable elastic piece abuts against the clamp button.

4. The unmanned aerial vehicle according to claim 1, wherein at least one of the first end and the second end of the restorable elastic piece includes a bent portion.

5. The unmanned aerial vehicle according to claim 1, wherein the first end of the restorable elastic piece abuts against the shell.

6. The unmanned aerial vehicle according to claim 1, wherein the first end of the restorable elastic piece is fixed with the shell.

7. The unmanned aerial vehicle according to claim 1, wherein the second end of the restorable elastic piece is coupled to the clamp button.

8. The unmanned aerial vehicle according to claim 1, wherein the second end of the restorable elastic piece is disposed on an inner side of the clamp button.

9. The unmanned aerial vehicle according to claim 1, wherein the unmanned aerial vehicle comprises at least two clamp buttons.

10. The unmanned aerial vehicle according to the claim 9, wherein the at least two clamp buttons are separately disposed on opposite sides of the shell.

11. The unmanned aerial vehicle according to the claim 1, wherein the clamp button comprises a body, the hook being on an end of the body of the clamp button.

12. The unmanned aerial vehicle according to the claim 11, wherein a groove is formed between the body of the clamp button and the hook.

13. The unmanned aerial vehicle according to claim 11, wherein the clamp button defines an anti-slip structure on an outer surface of the body of the clamp button.

14. The unmanned aerial vehicle according to claim 13, wherein the anti-slip structure is a wave-shape convex structure.

15. The unmanned aerial vehicle according to claim 1, wherein the unmanned aerial vehicle comprises at least two restorable elastic pieces, the at least two restorable elastic pieces being mirror symmetric.

16. The unmanned aerial vehicle according to claim 1, wherein the restorable elastic pieces is S-shape.

17. The unmanned aerial vehicle according to claim 16, wherein the first end of the restorable elastic piece is stuck in the shell and an arc surface of the second end contacts a lower surface of the clamp button.

18. The unmanned aerial vehicle according to claim 1, wherein the number of the restorable elastic piece is the same as the number of the clamp button.

19. The unmanned aerial vehicle according to claim 1, wherein the two rotor blades of the propeller are foldable.

20. The unmanned aerial vehicle according to claim 1, wherein the propulsion assembly further comprises a motor, the motor being configured to drive the propeller to rotate in the air.

21. The unmanned aerial vehicle according to claim 20, wherein the propeller further comprises a hub, the propeller being mounted on the motor through the hub.

22. The unmanned aerial vehicle according to claim 1, wherein the propulsion assembly comprises a first propulsion assembly and a second propulsion assembly, the first propulsion assembly comprising a first propeller, the second propulsion assembly comprising a second propeller;
wherein the first propeller rotates in clockwise direction and the second propeller rotates in counterclockwise direction.

23. The unmanned aerial vehicle according to claim 1, comprising:
an electrical component disposed in a cavity formed by the main body, or in a cavity formed by at least one of the arms;
wherein the electrical component comprises at least one of the Global Position System module, compass, flight control module, and image processing unit.

24. The unmanned aerial vehicle according to claim 1, comprising a landing gear.

25. The unmanned aerial vehicle according to claim 24, wherein the landing gear is foldable.

26. The unmanned aerial vehicle according to claim 24, wherein the landing gear is detachable.

27. The unmanned aerial vehicle according to claim 1, wherein in a state where the battery assembly is completely pushed or positioned into the battery compartment, the restorable elastic piece is configured to automatically rebound so that (a) the clamp button is capable of returning to its original position and (b) the battery assembly is held in position by the cooperation of the clamping portion and the clamp button.

28. The unmanned aerial vehicle according to claim 1, the battery assembly is capable of being removable from the battery compartment in a state where the clamp button is pressed down.

29. The unmanned aerial vehicle according to claim 1, wherein the clamp button is configured to cause the restorable elastic piece to be pressed down in a state where the battery assembly is not completely pushed into the battery compartment or is only partially positioned in the battery compartment.

* * * * *